United States Patent
Goto et al.

(10) Patent No.: US 6,961,581 B2
(45) Date of Patent: Nov. 1, 2005

(54) NETWORK DEVICE OF MOBILE COMMUNICATIONS SYSTEM, AND METHOD OF POWER MANAGEMENT THEREFOR

(75) Inventors: Haruhiko Goto, Kawasaki (JP); Tomomitsu Yamanobe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 660 days.

(21) Appl. No.: 09/968,447

(22) Filed: Oct. 1, 2001

(65) Prior Publication Data

US 2003/0003941 A1 Jan. 2, 2003

(30) Foreign Application Priority Data

Jun. 27, 2001 (JP) ........................... 2001-194616

(51) Int. Cl.$^7$ ............... H04B 7/00; H04B 7/185; H04B 1/04; H04Q 7/20; H04Q 11/12
(52) U.S. Cl. ............... 455/522; 455/13.4; 455/127.1
(58) Field of Search ............... 455/522, 13.4, 455/127.1, 561, 115.1

(56) References Cited

U.S. PATENT DOCUMENTS 5,781,856 A * 7/1998 Jacobs et al. ............... 455/403
5,924,015 A * 7/1999 Garrison et al. ............ 455/13.4
6,230,022 B1 * 5/2001 Sakoda et al. .............. 455/522
6,351,651 B1 * 2/2002 Hamabe et al. ............. 455/522
6,865,393 B1 * 3/2005 Baum et al. ................ 455/522

FOREIGN PATENT DOCUMENTS

JP         11055180         2/1999

\* cited by examiner

Primary Examiner—Sonny Trinh
Assistant Examiner—Thai N. Vu
(74) Attorney, Agent, or Firm—Karten Muchin Rosenman LLP

(57) ABSTRACT

In management of power in a radio base station, a power allocation controller allocates a prescribed transmission power to a communication channel requested for set-up within an allocatable power range, and forgoes allocation of transmission power when allocation is not possible. A channel power controller exercises control of transmission power and, when actual transmission power falls below the transmission power allocation by the power allocation controller, returns the power difference between these powers and subsequently repeats similar control while regarding the actual transmission power to as allocated transmission power. As a result, the limited power of a radio base station can be utilized efficiently.

9 Claims, 15 Drawing Sheets

FIG. 2
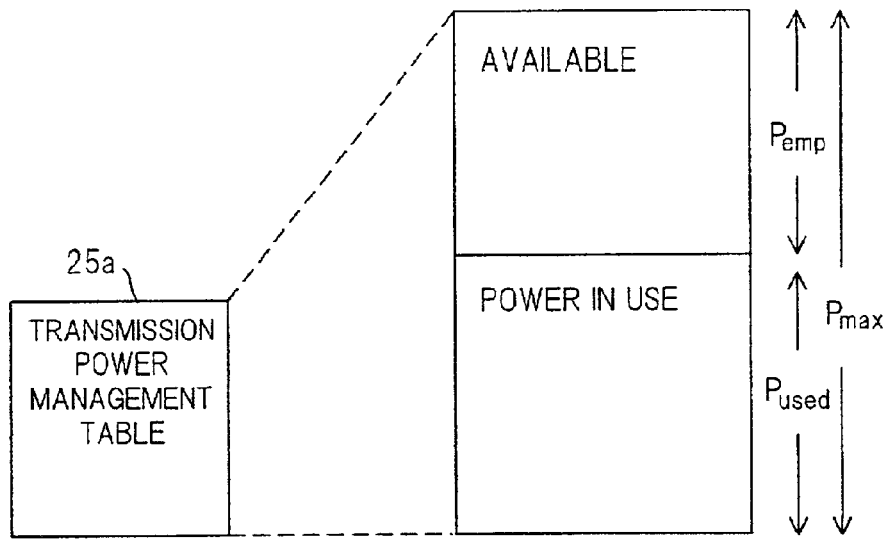
FIG. 3A
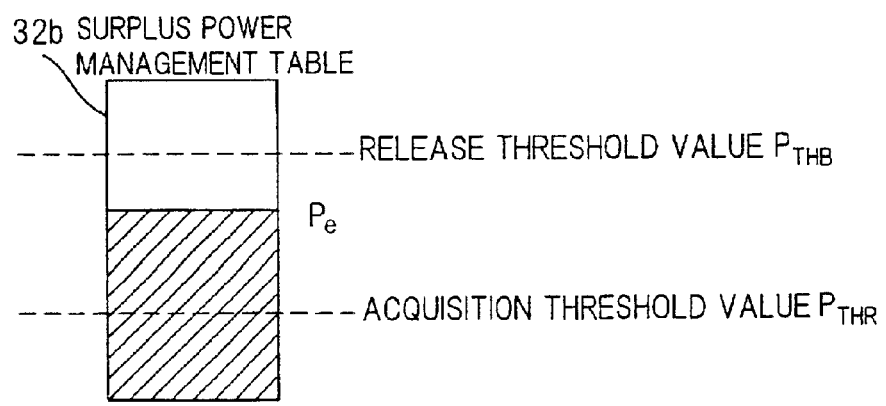
FIG. 3B

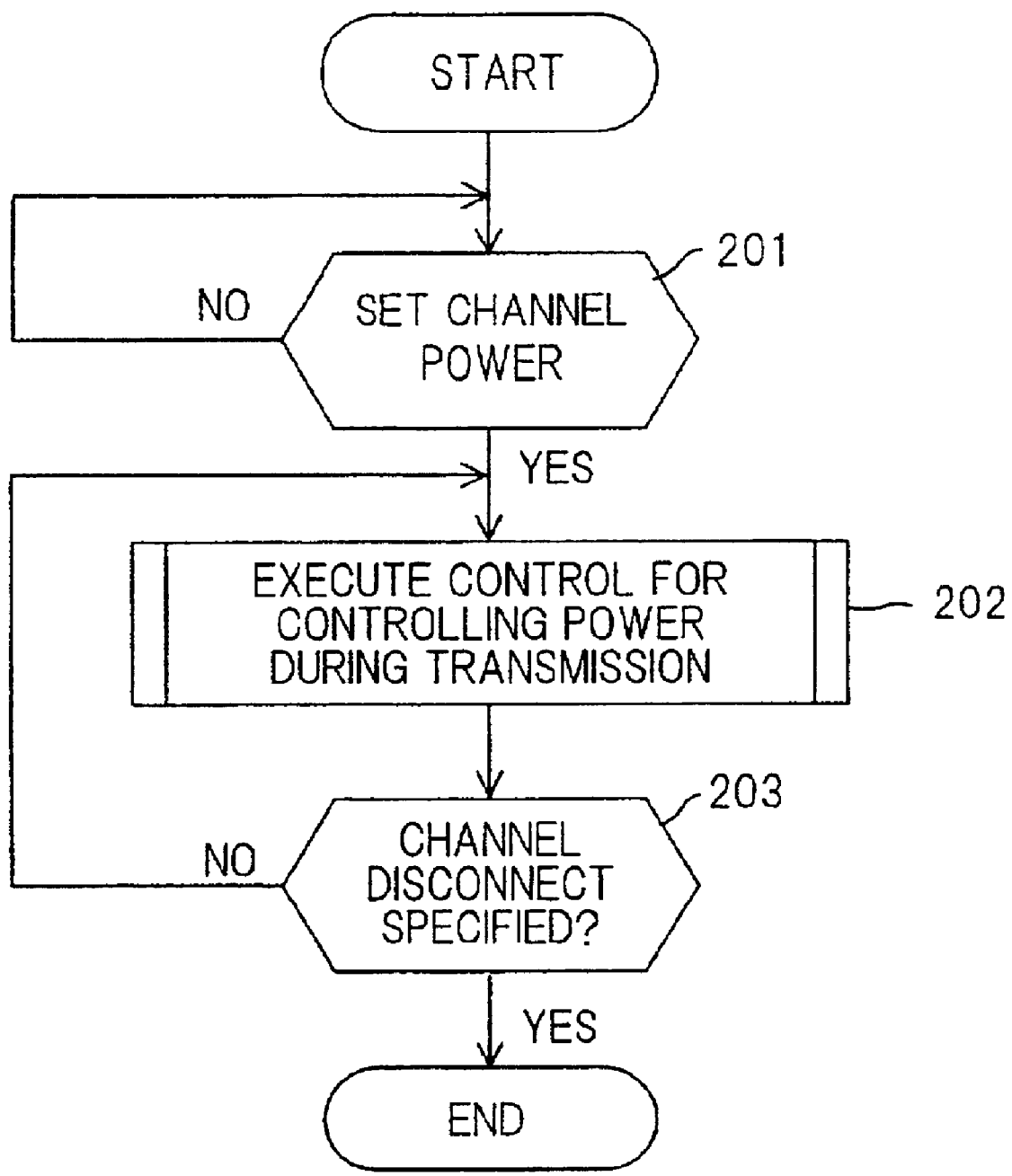

FIG. 13

| RATE | MAXIMUM AMOUNT OF TRANSMISSION POWER | PROBABILITY OF OCCURRENCE |
|---|---|---|
| R_0 | H_0 | P_0 |
| R_1 | H_1 | P_1 |
| R_2 | H_2 | P_2 |
| ... | | |
| R_(n-1) | H_(n-1) | P_(n-1) |

FIG. 14

| NUMBER OF CHANNELS | POWER RETURN RATIO | POWER ACQUISITION RATIO |
|---|---|---|
| 1~5 | P_REL_1_5 | P_ADD_1_5 |
| 6~10 | P_REL_6_10 | P_ADD_6_10 |
| 11~15 | P_REL_11_15 | P_ADD_11_15 |
| ... | ... | ... |
| 26~30 | P_REL_26_30 | P_ADD_26_30 |

NETWORK DEVICE OF MOBILE COMMUNICATIONS SYSTEM, AND METHOD OF POWER MANAGEMENT THEREFOR

BACKGROUND OF THE INVENTION

This invention relates to a network device of a mobile communications system and to a method of managing the power of the network device. More particularly, the invention relates to a network device of a mobile communications system and to a method of managing the power thereof, wherein maximum transmission power of each communication channel is updated at any time based upon transmission power control, thereby improving efficiency of power use and making it possible to increase the number of subscribers accommodated.

As shown in FIG. 15, a base station transceiver subsystem (BTS) 1 for performing communication wirelessly with a mobile station 2 has an amplifier 1$a$, a radio unit 1$b$, baseband signal processors 1$c_1$ to 1$c_n$ for executing multiple-channel baseband signal processing, an intraoffice control unit (BTSC) 1$d$ and an interface 1$e$ for interfacing a base station controller (BSC) 3.

The amplifier 1$a$ amplifies sent and received signals. The radio unit 1$b$ frequency-converts a high-frequency signal, which enters from an antenna via the amplifier 1$a$, to a baseband signal, and frequency-converts a baseband signal to a high-frequency signal and inputs the high-frequency signal to the antenna via the amplifier 1$a$. The baseband signal processors 1$c_1$ to 1$c_n$ subject communication signals (various control signals, voice signals and data signals, etc.) of respective multiple channels to processing such as spreading and quadrature modulation and input the processed signals to the radio unit 1$b$. Further, the baseband signal processors 1$c_1$ to 1$c_n$ subject communication signals of respective multiple channels that enter from the radio unit to processing such as quadrature detection, despreading and data demodulation and input demodulated data to the interface 1$e$. The latter executes N-channel signal multiplexing/demultiplexing processing and processing for signal conversion between a base station transceiver subsystem (BTS) and a base station controller (BSC). The intraoffice control unit 1$d$ exercises various control operations such as call control, communication-channel set-up control and power management control.

Power management control by the intraoffice control unit 1$d$ is performed as follows: Maximum transmission power of a communication channel is set beforehand depending upon such factors as transmission speed, voice call and data call, etc. When there is a request to set up a communication channel, the intraoffice control unit 1$d$ determines whether it is possible to allocate the maximum transmission power to the communication channel, whose set-up has been requested, within allocatable power limits. If allocation is possible, the maximum transmission power is allocated to this communication channel and processing of this communication channel is assigned to any of the baseband signal processors 1$c_1$ to 1$c_n$. If allocation is not possible, then the intraoffice control unit 1$d$ does not allocate transmission power and responds to the requesting side by indicating that channel connection is not possible. FIG. 16 illustrates a case where allocation of maximum transmission power to channels #0 and #1 is possible and the processing of channels #0, #1 has been assigned to the baseband signal processor 1$c_1$.

With regard to transmission power control in the baseband signal processors 1$c_1$ to 1$c_n$, transmission power control of individual channels typified by closed-loop control is carried out on a per-channel basis. By virtue of transmission power control, actual transmission power becomes smaller the above-mentioned allocated maximum transmission power.

FIG. 17 is a diagram useful in describing downstream-line closed-loop transmission power control of individual channels in a baseband signal processor. This diagram shows the components constituting one channel.

The baseband signal processor 1$c_1$ has a spread-spectrum modulator 5$a$ for subjecting transmit data to spread-spectrum modulation using a spreading code that conforms to the specified channel, and a power amplifier 5$b$ for amplifying its input, which is obtained by subjecting the spread-spectrum modulated signal to processing such as quadrature modulation and frequency conversion, and transmitting the amplified signal to the mobile station 2 from an antenna. A despreader 2$a$ in the receiver section of the mobile station 2 subjects a receive signal to despread processing and a demodulator 2$b$ demodulates the receive data. A SIR measurement unit 2$c$ measures the power ratio between the receive signal and an interference signal. A comparator 2$d$ compares a target SIR with the measured SIR, creates a command which lowers the transmission power by a TPC (Transmission Power Control) bit if the measured SIR is greater than the target SIR, and creates a command which raises the transmission power by the TPC bit if the measured SIR is less than the target SIR. The target SIR is a SIR value necessary to obtain, e.g., $10^{-3}$ (error occurrence at a rate of one error per thousand times). The target SIR is input to the comparator 2$d$ from a target-SIR setting unit 2$e$. A spreading modulator 2$f$ subjects transmit data and the TPC bit to spread-spectrum modulation. Following spread-spectrum modulation, the mobile station 2 applies processing such as D/A conversion, quadrature modulation, frequency conversion and power amplification and transmits the resulting signal to the base station 1 from an antenna. A despreader 5$c$ in the baseband signal processor on the side base station applies despread processing to the signal received from the mobile station 2, and a demodulator 5$d$ modulates the receive data and TPC bit to control the transmission power of the power amplifier 5$b$ in accordance with a command specified by the TPC bit.

Thus, the intraoffice control unit (BTSC) 1$d$ and the baseband signal processors 1$c_1$ to 1$c_n$ exercise power control but the power control by each is performed independently of the other without any cooperation between them. As a consequence, by virtue of transmission power control on a per-channel basis, transmission power stabilizes in a state in which it is less than the initial transmission power established at the time of channel set-up. As a result, even if surplus power is produced (see FIG. 16), no measures for dealing with this are taken in the prior art. Conventionally, therefore, power is allocated to each channel excessively and, hence, the number of multiplexed channels, i.e., the number of subscribers that can be accommodated, per base station diminishes.

Further, there are instances where power greater than the allocated maximum transmission power becomes necessary when communication conditions deteriorate. With the prior art, however, power in excess of maximum transmission power cannot be allocated. The problem that arises in this case is that communication quality cannot be improved.

SUMMARY OF THE INVENTION

Accordingly, an object of the present invention is to so arrange it that the limited power of a radio base station can be utilized efficiently.

Another object of the present invention is to so arrange it that transmission power that is in surplus at each communication channel can be exploited by re-allocating it to the channel of a new call.

A further object of the present invention is to improve communication quality by so arranging it that power greater than maximum transmission power can be allocated.

According to a first aspect of the present invention, the foregoing objects are attained by providing a network device of a mobile communications system, the device having a power allocation controller and a channel power controller. The power allocation controller allocates a prescribed transmission power to a communication channel requested for set-up within an allocatable power range. When allocation is not possible, the power allocation controller does not allocate transmission power. The channel power controller performs control of transmission power. When actual transmission power falls below the allocated transmission power, the channel power controller returns power equivalent to the power difference between these powers to the power allocation controller and subsequently repeats similar control while regarding the actual transmission power as the allocated transmission power. Further, when the actual transmission power exceeds the allocated transmission power, the channel power controller requests the power allocation controller for power equivalent to the power difference between these powers.

According to a second aspect of the present invention, the foregoing objects are attained by providing a network device of a mobile communications system, the device having a power allocation controller, a channel power controller and a multiple-channel power management unit. The power allocation controller allocates a prescribed transmission power to a communication channel requested for set-up within an allocatable power range. When allocation is not possible, the power allocation controller does not allocate transmission power. The channel power controller, which is provided on a per-channel basis, performs transmission power control on a per-channel basis. When actual transmission power falls below the allocated transmission power, the channel power controller returns power equivalent to the power difference between these and subsequently repeats similar control while regarding the actual transmission power as the allocated transmission power. When the actual transmission power exceeds the allocated transmission power, the channel power controller requests power equivalent to the power difference between these. The multiple-channel power management unit manages as surplus power the power returned from each channel power controller and allocates, from the surplus power, the power requested from each channel power controller. When the surplus power exceeds a release threshold value, the multiple-channel power management unit returns the amount of surplus power above the threshold value to the power allocation controller. When the surplus power falls below an acquisition threshold value, the multiple-channel power management unit requests the power allocation controller for power equivalent to the amount of shortfall below the threshold value.

The multiple-channel power management unit manages the allocated transmission power of each channel and, in response to a communication-channel disconnect request, returns to the power allocation controller the transmission power that was allocated to this communication channel.

In accordance with the first and second aspects of the present invention, the limited power of a radio base station can be utilized efficiently, allowing the number of accommodated users to be increased. Further, in accordance with the first and second aspects of the invention, transmission power that is in surplus at each communication channel can be returned to the power allocation controller. As a result, surplus power can readily be exploited by being re-allocated to communication channels of new calls. Further, in accordance with the first and second aspects of the invention, power greater than the maximum transmission power can be allocated to a channel. This makes it possible to improve communication quality if communication conditions deteriorate.

Other features and advantages of the present invention will be apparent from the following description taken in conjunction with the accompanying drawings.

BRIEF DESCRIPTION OF THE DRAWINGS

FIG. 2 is a diagram useful in describing a transmission power management table;

FIGS. 3A, 3B are diagrams useful in describing tables provided in a power management unit;

FIG. 5 is a flowchart of transmission power allocation processing (in an individual-channel baseband section) at the time of channel connection;

FIG. 13 is a diagram useful in describing the correspondence among speed of a variable-transmission-rate communication channel, maximum transmission power and probability of occurrence;

FIG. 14 is a diagram useful in describing the correspondence among number of multiplexed channels, power return ratio and power acquisition ratio;

DESCRIPTION OF THE PREFERRED EMBODIMENT (A) Structure of Base Station Transceiver Subsystem FIG. 1 is a block diagram illustrating the entirety of a mobile radio system that includes a base station transceiver subsystem according to the present invention. The system includes a base station transceiver subsystem (BTS) 11 which communicates with mobile stations wirelessly, a mobile station (cellular telephone terminal) 12, a base station controller (BSC) 13, a maintenance/operation controller 14 connected to the base station controller 13 for entering office operation data or the like, and a network 15 such as a public switched telephone network.

Figure 1:
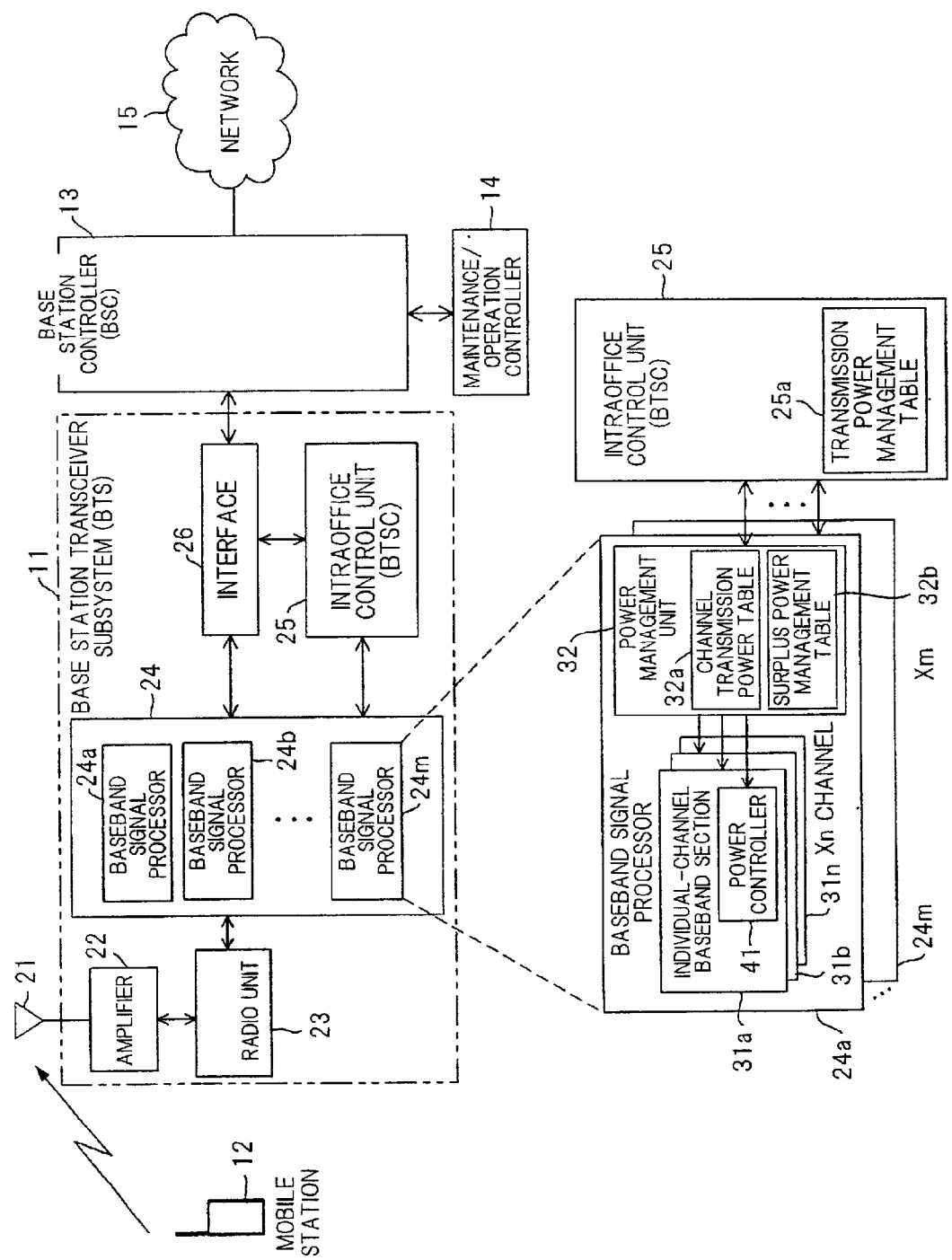
FIG. 1 is a block diagram illustrating the entirety of a mobile radio system that includes a base station transceiver subsystem according to the present invention.

The base station transceiver subsystem 11 has an antenna 21, an amplifier 22, a radio unit 23, a baseband unit 24 for executing baseband signal processing, a control unit (intraoffice control unit) 25 within the base station for executing channel assignment control and power management control, etc., and a transmission interface 26.

The amplifier 22 amplifies sent and received signals. The radio unit 23 frequency-converts a high-frequency signal, which enters from the antenna 21 via the amplifier 22, to a baseband signal, and frequency-converts a baseband signal to a high-frequency signal and inputs the high-frequency signal to the antenna 21 via the amplifier 22. The baseband unit 24 is provided with a plurality of baseband signal processors 24a to 24m for subjecting communication signals (various control signals, voice signals and data signals, etc) of respective multiple channels to processing such as spreading and quadrature modulation and inputting the processed signals to the radio unit 23. Further, the baseband signal processors 24a to 24m subject communication signals of respective multiple channels that enter from the radio unit 23 to processing such as quadrature detection, despreading and data demodulation and input demodulated data to the interface 26. The latter executes N-channel signal multiplexing/demultiplexing processing and processing for signal conversion between the base station transceiver subsystem (BTS) and base station controller (BSC). The intraoffice control unit 25 exercises call control, communication-channel set-up control and transmission power management control that is in accordance with the present invention. BTS operation data necessary for power management control and channel assignment control is set by the maintenance/operation controller 14 and is input to the intraoffice control unit 25 from the base station controller (BSC) 13 via the transmission interface 26.

The intraoffice control unit 25 is provided with a transmission power management table 25a for managing the transmission power of the overall base station. As shown in FIG. 2, total allocatable power $P_{max}$, power in use $P_{used}$ and remaining allocatable power (available power) $P_{emp}$ are managed.

Each of the baseband signal processors 24a to 24m has n-channel individual-channel baseband sections 31a to 31n, and a power management unit 32 for managing the power of these multiple channels.

Figure 17:
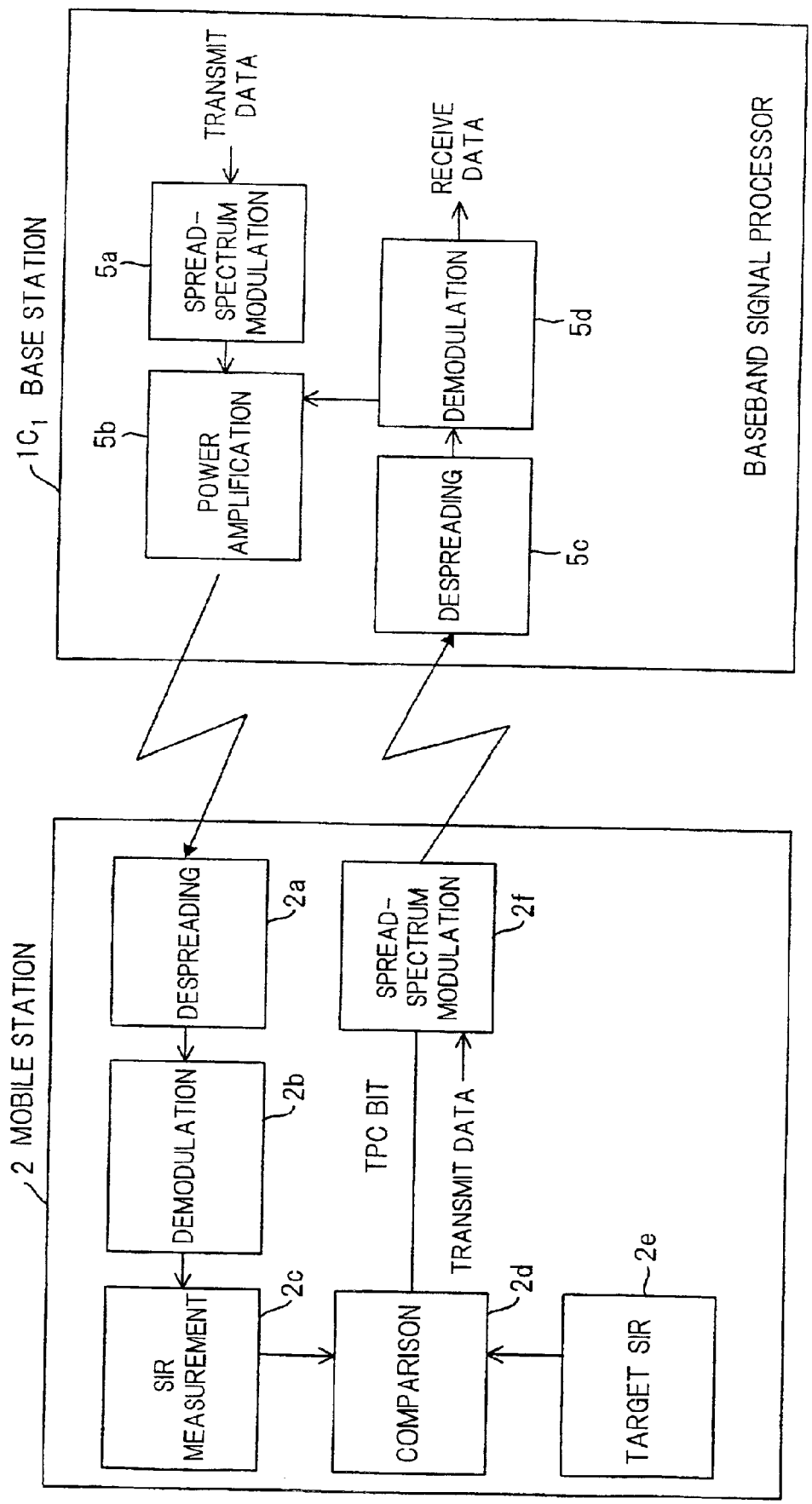
FIG. 17 is a diagram useful in describing downstream-line closed-loop transmission power control of individual channels in a baseband signal processor.

Each of the individual-channel baseband sections 31a to 31n is provided with a power controller 41 for performing transmission power control on a per-channel basis (see FIG. 17). When actual transmission power falls below the transmission power that was allocated at channel set-up, the power controller 41 returns the power difference between these (surplus power) and subsequently repeats similar control while regarding the actual transmission power as the allocated transmission power. Further, when the actual transmission power exceeds the allocated transmission power, the power controller 41 makes a request for the power difference (power equivalent to the amount of insufficiency).

The power management unit 32 is provided with a channel transmission power table 32a, and a surplus power management table 32b. The channel transmission power table 32a manages the transmission power allocated to the individual-channel baseband sections 31a to 31n, as shown in FIG. 3A, and the surplus power management table 32b manages the sum total $P_e$ of surplus power returned from the individual-channel baseband sections 31a to 31n, a release threshold value $P_{THB}$ for returning surplus power to the intraoffice control unit 25, and an acquisition threshold value $P_{THR}$ for requesting the intraoffice control unit 25 for provision of additional power equivalent to the amount of insufficiency.

The power management unit 32 manages the power, which has been returned from the individual-channel baseband sections 31a to 31n, as the surplus power $P_e$, and allocates, from the surplus power, the additional power requested by the individual-channel baseband sections 31a to 31n. Further, when the surplus power $P_e$ exceeds the release threshold value $P_{THB}$, the power management unit 32 returns the amount of surplus power above the threshold value to the intraoffice control unit 25. When the surplus power falls below the acquisition threshold value $P_{THR}$, the power management unit 32 requests the intraoffice control unit 25 for power equivalent to the amount of shortfall below the threshold value.

Figure 4:
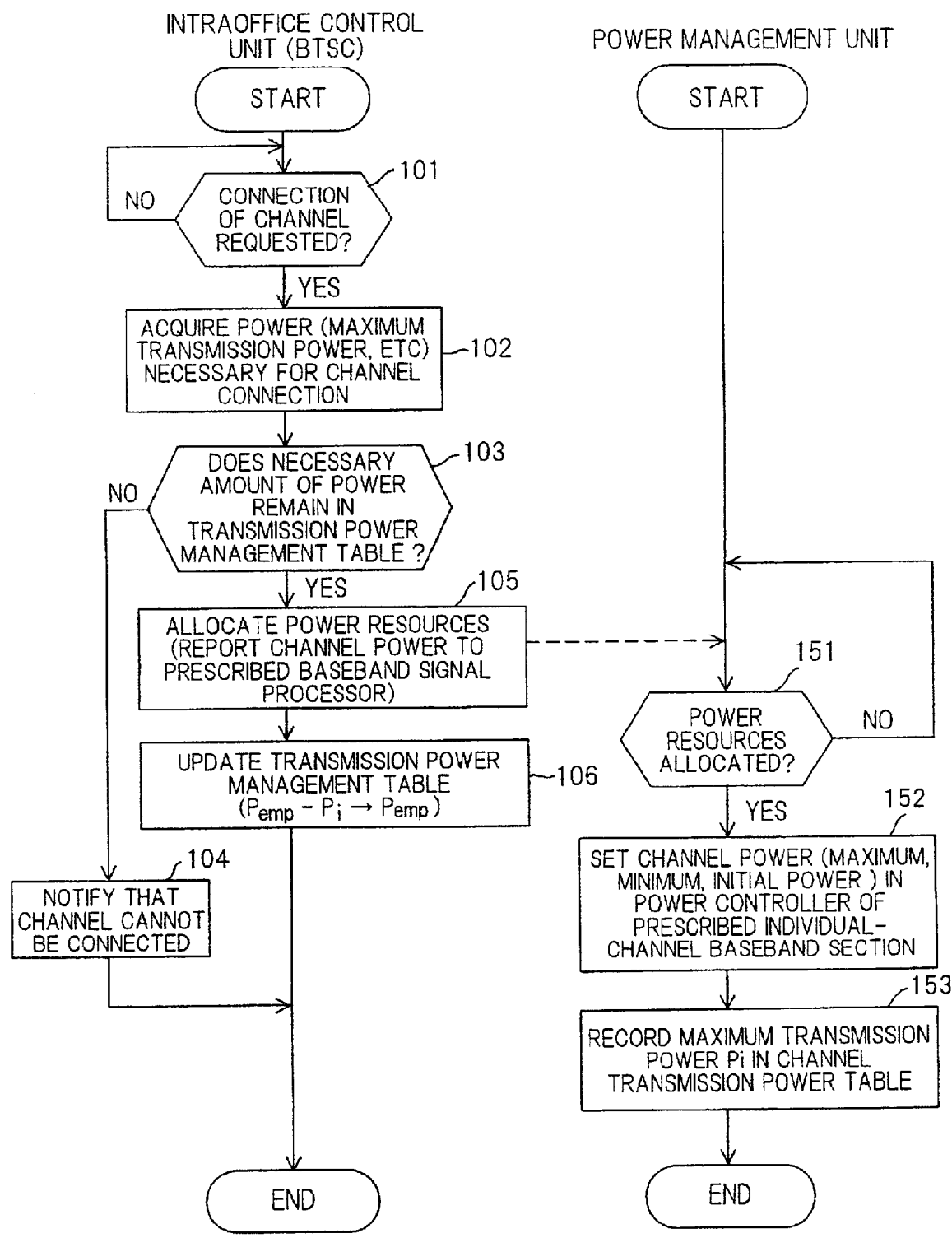
FIG. 4 is a flowchart of transmission power allocation processing (in an intraoffice control unit and power management unit) at the time of channel connection.

(B) Power Management Control (a) Processing for allocating transmission power at time of channel connection FIGS. 4 and 5 are flowcharts of processing for allocating transmission power at the time of channel connection.

Figure 6A:
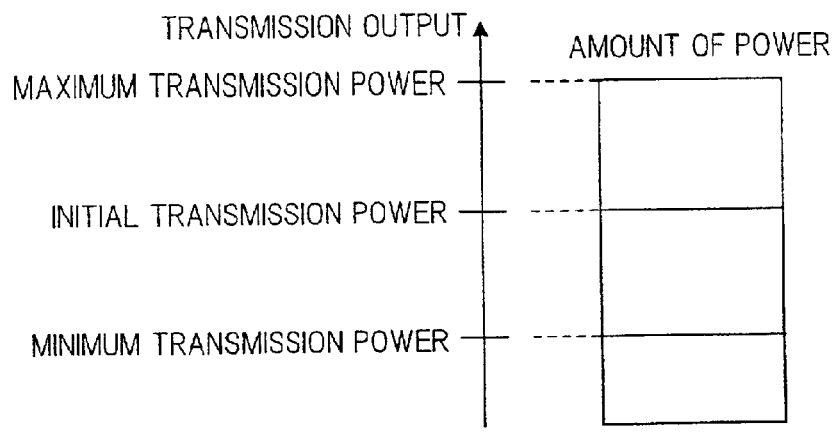
FIGS. 6A, 6B are diagrams useful in describing channel power.

When a request to connect a speech channel is issued (step 101), the intraoffice control unit 25 acquires the power (channel power) necessary to connect the channel (step 102). Though channel power includes maximum transmission power, minimum transmission power and initial transmission power, as shown in FIG. 6A, the minimum transmission power and initial transmission power are not necessarily required. By providing beforehand a table giving the correspondence between transmission rate and channel power, maximum transmission power, minimum transmission power and initial transmission power can be acquired from this table. These can also be found by calculation, as will be described later.

Next, the intraoffice control unit 25 checks to see whether the necessary power (maximum transmission power $P_i$) remains by referring to the transmission power management table 25a (step 103). If the necessary power does not remain ($P_{emp} < P_i$ holds), the intraoffice control unit 25 notifies the source of the channel connection request that the channel cannot be connected (step 104). If the necessary power does remain (i.e., if $P_{emp} > P_i$ holds), however, the intraoffice control unit 25 allocates power resources to the power management unit 32 of the baseband signal processor that executes the processing for the requested speech channel and gives notification of the channel power acquired at step 102 (step 105). Next, the intraoffice control unit 25 updates the remaining power $P_{emp}$ (step 106) in accordance with the operation $$P_{emp} - P_i \rightarrow P_{emp}$$

where $P_i$ represents the maximum transmission power.

In parallel with the foregoing, the power management unit 32 of the baseband signal processor performs monitoring to determine whether allocation of power sources has been carried out (step 151). If power resources have been allocated from the intraoffice control unit 25, then the power management unit 32 sets the channel power in the power controller 41 of the prescribed individual-channel baseband section (step 152). It should be noted that this individual-channel baseband section executes baseband processing of the requested speech channel. Next, the power management unit 32 records maximum transmission power $P_i$ in the channel transmission power table 32a in association with this individual-channel baseband section (step 153).

When the channel power is set (step 201) in FIG. 5, the power controller 41 of the individual-channel baseband section subsequently executes transmission-in-progress power control until channel disconnect is specified (step 202). If channel disconnect is specified ("YES" at step 203), then the power controller 41 terminates power control.

Figure 6B:
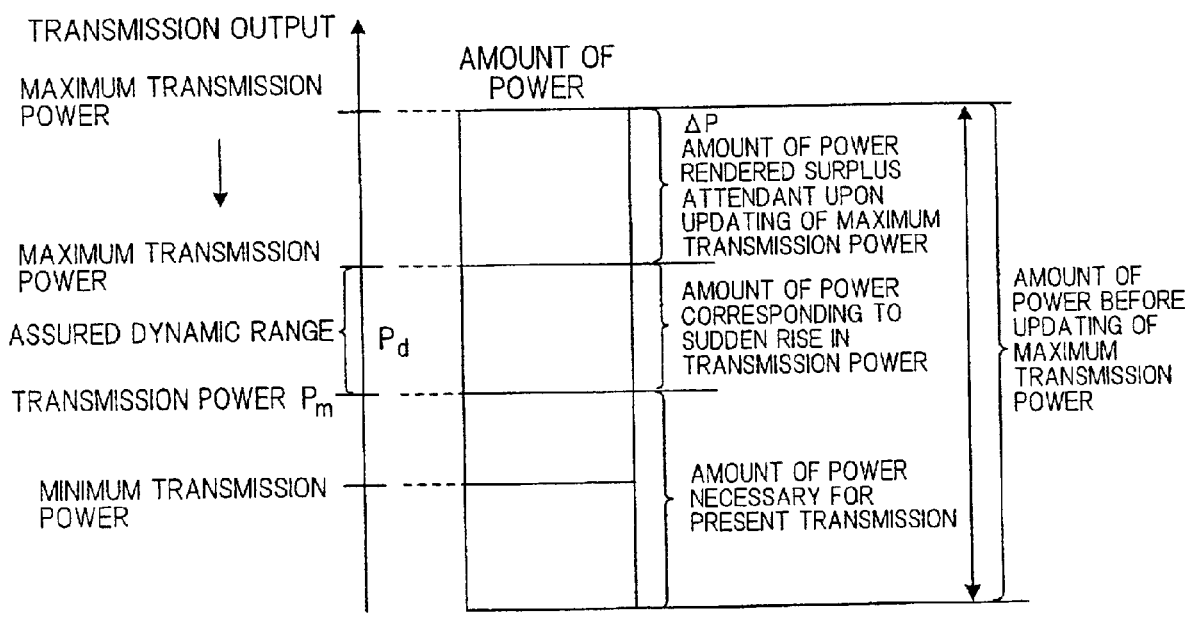
Figure 7:
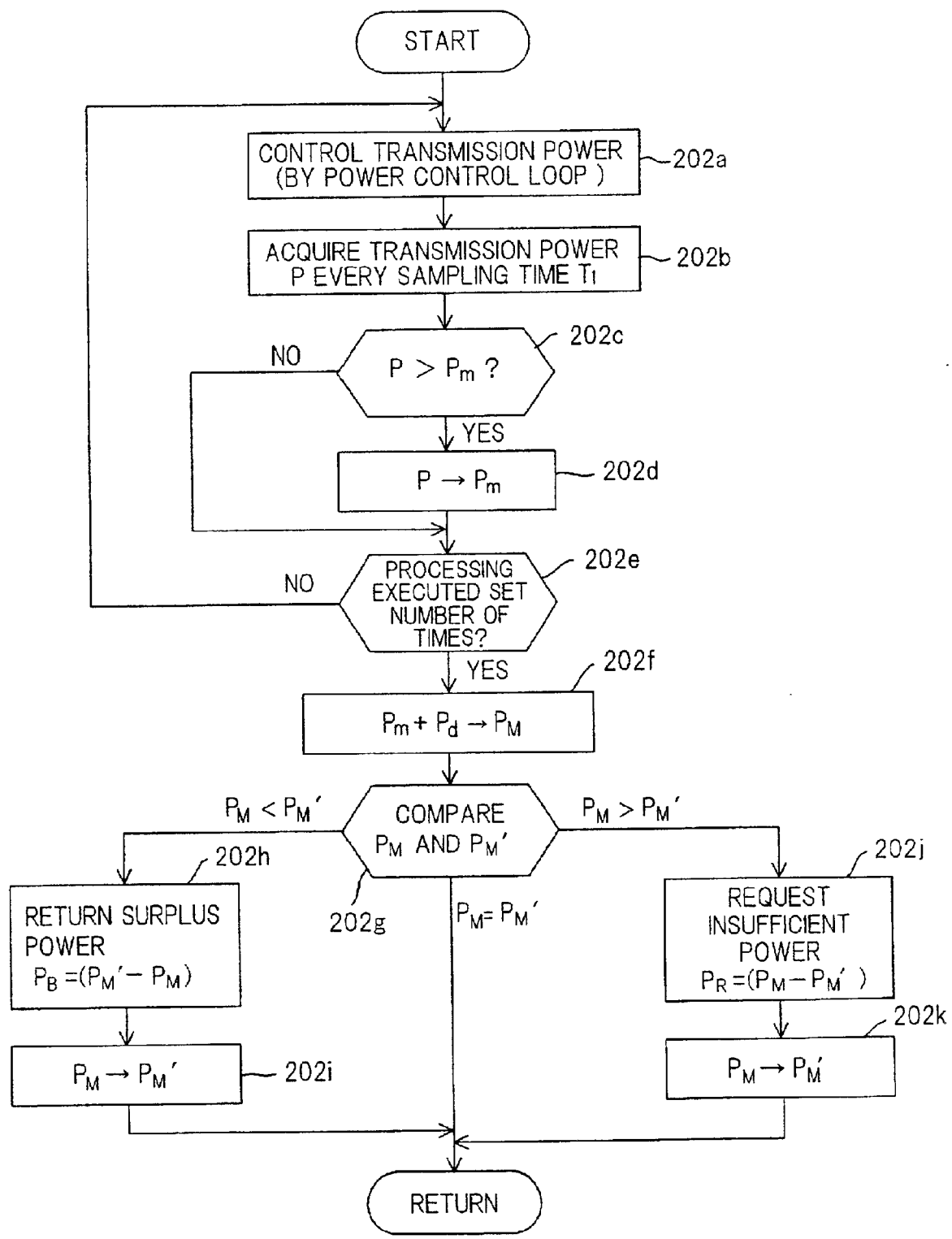
FIG. 7 is a flowchart of transmission-in-progress power control processing in a power controller of the individual-channel baseband section.

(b) Transmission-in-Progress Power Control Processing of Individual-Channel Baseband Section FIG. 7 is a flowchart of transmission-in-progress power control processing (the processing of step 202 in FIG. 5) in the power controller 41 of the individual-channel baseband section. When the channel power is set (step 201 in FIG. 5), the power controller 41 controls transmission power by a power control loop (step 202a). Transmission power $P_m$ for obtaining a prescribed quality is decided by this power transmission control, as shown in FIG. 6(B). Maximum transmission power is updated to a power obtained by adding an assured dynamic range $P_d$ (amount of power for dealing with a sudden rise in transmission power) to the transmission power $P_m$, and a difference $\Delta P$ in maximum transmission power before and after updating becomes the surplus power.

Figure 8:
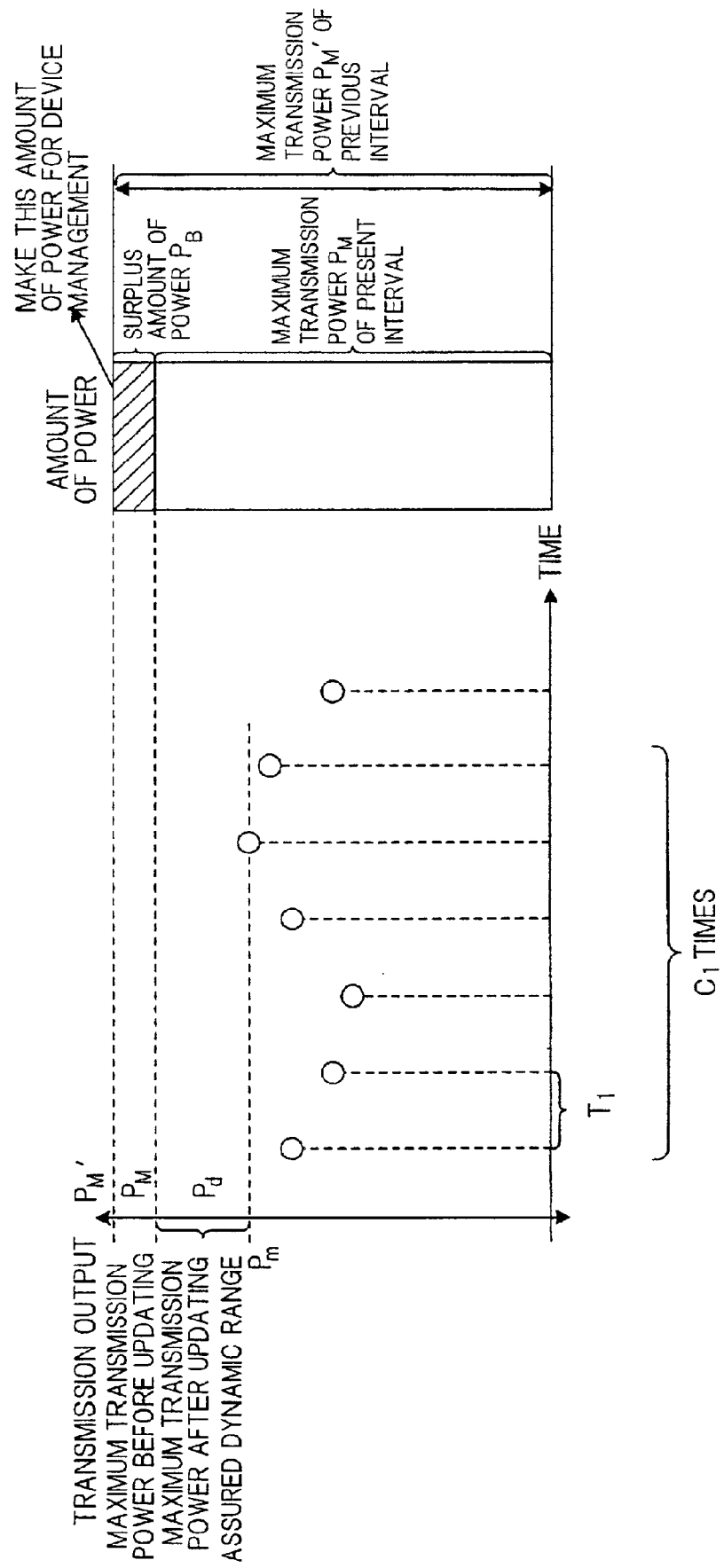
FIG. 8 is a diagram useful in describing processing for updating maximum transmission power and return of surplus power.

Processing for updating the maximum transmission power is executed from step 202b onward. As shown in FIG. 8, one interval is defined by a sampling count $c_1$, maximum transmission power $P_M$ (obtained by adding on the assured dynamic range) of the present interval is found, the maximum transmission power $P_M$ of the present interval and maximum transmission power $P_M'$ of the preceding interval are compared in terms of magnitude and, if the maximum transmission power $P_M$ of the present interval is smaller, the difference $P_B$ between the two is returned as surplus power and the maximum transmission power $P_M$ of the present interval is adopted as the latest maximum transmission power. If the maximum transmission power $P_M$ of the present interval is larger, on the other hand, then the difference $P_R$ is requested as the amount of power equivalent to the insufficiency and the maximum transmission power $P_M$ of the present interval is adopted as the latest maximum transmission power.

The maximum transmission power $P_M$ of the present interval is decided first. To accomplish this, the transmission power P is monitored at prescribed sampling times $T_1$ (step 202b) and this is compared with the maximum transmission power $P_m$ of the present interval thus far (step 202c). If $P>P_m$ holds, P is made the maximum transmission power $P_m$ of the present intervals (step 202d).

Next, it is determined whether the above-described processing has been executed the set number of times ($c_1$), i.e., whether the present interval has ended (step 202e). If the present interval has not ended, the processing from step 202a onward is repeated. If the present interval has ended, then power obtained by adding the assured dynamic range $P_d$ to the maximum transmission power $P_m$ is adopted as the true maximum transmission power $P_M$ of the present interval ($P_m+P_d \rightarrow P_M$; step 202f).

This is followed by comparing the maximum transmission power $P_M$ of the present interval and the maximum transmission power $P_M'$ of the previous interval (step 202g). If $P_M<P_M'$ holds, then the surplus power $P_B$ is calculated in accordance with the following equation:

$$P_B = P_M' - P_M$$

the surplus power $P_B$ is returned to the power management unit 32 of the baseband signal processor (step 202h) and the operation $P_M \rightarrow P_M'$ is performed (updating of the maximum transmission power; step 202i). Control thenceforth returns to the beginning and processing from start onward is executed.

If it is found at step 202g that $P_M>P_M'$ holds, then insufficient power $P_R$ is calculated in accordance with the following equation $$P_R = P_M - P_M'$$

and the power management unit 32 of the baseband signal processor is requested for power equivalent to the insufficient power $P_R$ (202j) and the operation $P_M \rightarrow P_M'$ is performed (updating of maximum transmission power; step 202k). Control thenceforth returns to the beginning and processing from start onward is executed.

Figure 9:
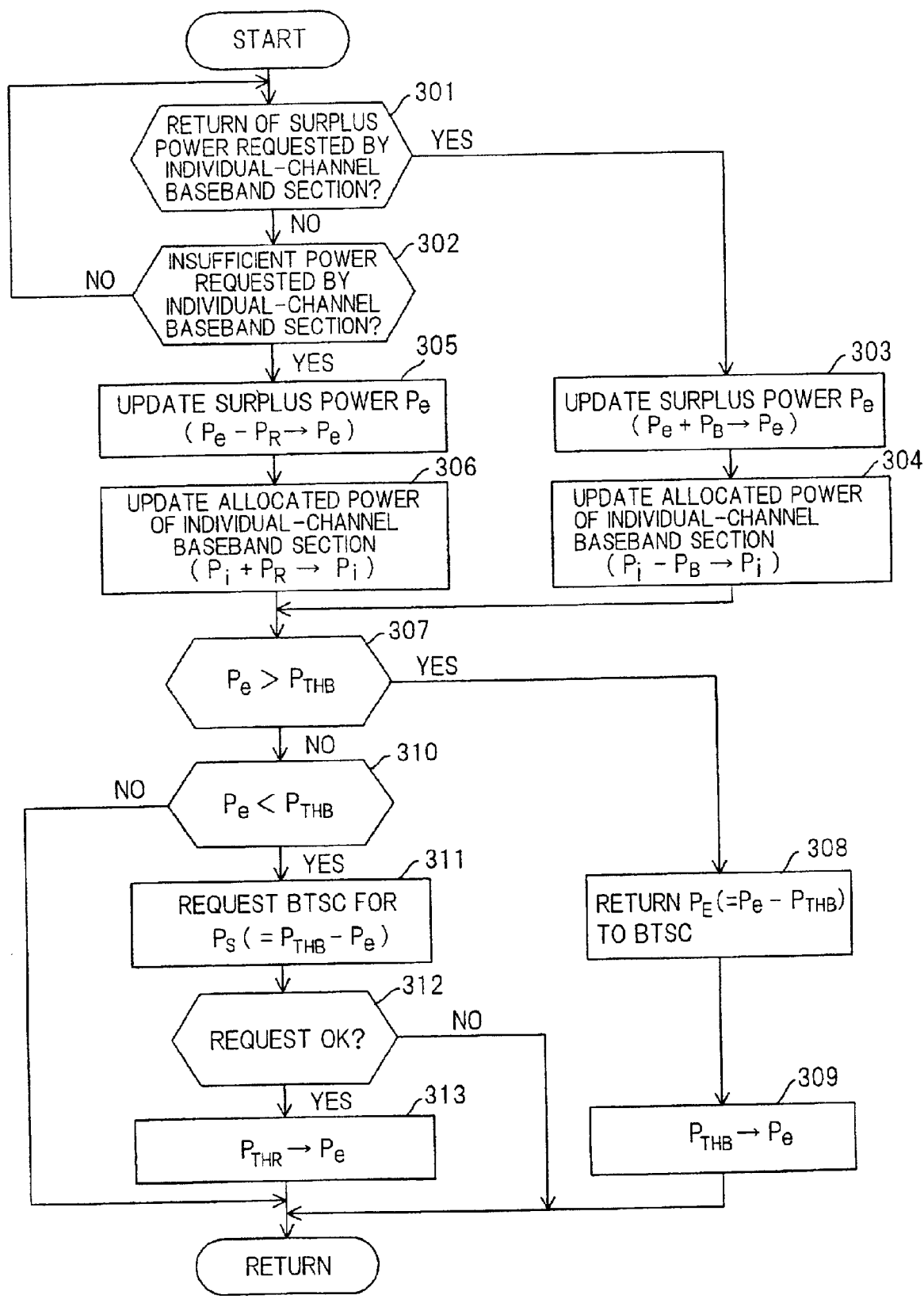
FIG. 9 is a flowchart of processing executed by a baseband signal processor for returning surplus power and requesting power to compensate for power insufficiency.

(c) Processing Executed by Baseband signal Processor for Returning Surplus Power and Requesting Power to Compensate for Power Insufficiency FIG. 9 is a flowchart of processing executed by the power management unit 32 of the baseband signal processors 24a to 24m for returning surplus power and requesting power equivalent to the insufficient power.

Monitoring is performed to determine whether a request for return of the surplus power $P_B$ (step 301) or a request for power equivalent to the insufficient power $P_R$ (step 302) has been issued from the power controller 41 of the individual-channel baseband sections 31a to 31n.

If return of surplus power $P_B$ is requested, then the surplus power $P_e$ being managed by the surplus power management table 32b is updated (step 303) in accordance with the following equation:

$$P_e + P_B \rightarrow P_e$$

Further, allocated power $P_i$ to the individual-channel baseband section being managed by the channel transmission power table 32a is updated (step 304) in accordance with the following equation:

$$P_i - P_B \rightarrow P_i$$

It should be noted that the initial value of the allocated power $P_i$ is the maximum transmission power allocated at the time of channel set-up.

If there is a request for power equivalent to the insufficient power $P_R$, the surplus power $P_e$ being managed by the surplus power management table 32b is updated (step 305) in accordance with the following equation:

$$P_e - P_R \rightarrow P_i$$

Further, allocated power $P_i$ to the individual-channel baseband section being managed by the channel transmission power table 32a is updated (step 306) in accordance with the following equation:

$$P_i + P_R \rightarrow P_i$$

The power management unit 32 of the baseband signal processor thenceforth checks to determine whether the surplus power $P_e$ is greater than the release threshold value $P_{THB}$ (step 307). If $P_e > P_{THB}$ holds, then the power management unit 32 returns the amount of surplus power $P_e$ ($P_e - P_{THB}$) above the threshold value to the intraoffice control unit 25 (step 308) and makes the surplus power $P_e$ equal to the release threshold value $P_{THB}$ ($P_{THB} \rightarrow P_e$; step 309).

If it is found at step 307 that $P_e \leq P_{THB}$ holds, the power management unit 32 checks to determine whether the surplus power $P_e$ is less than the acquisition threshold value $P_{THR}$ (step 310). If $P_e < P_{THR}$ holds, then the power management unit 32 requests the intraoffice control unit 25 for power in an amount equivalent to insufficient power $P_s$ (= $P_{THR} - P_e$) below the acquisition threshold value (step 311). If the request is granted (step 312), then the power management unit 32 makes the surplus power $P_e$ equal to the acquisition threshold value $P_{THR}$ ($P_{THR} \rightarrow P_e$; step 313). If the request for power in an amount equal to the power insufficiency is denied, then control returns to the beginning and processing from start onward is executed.

Figure 10:
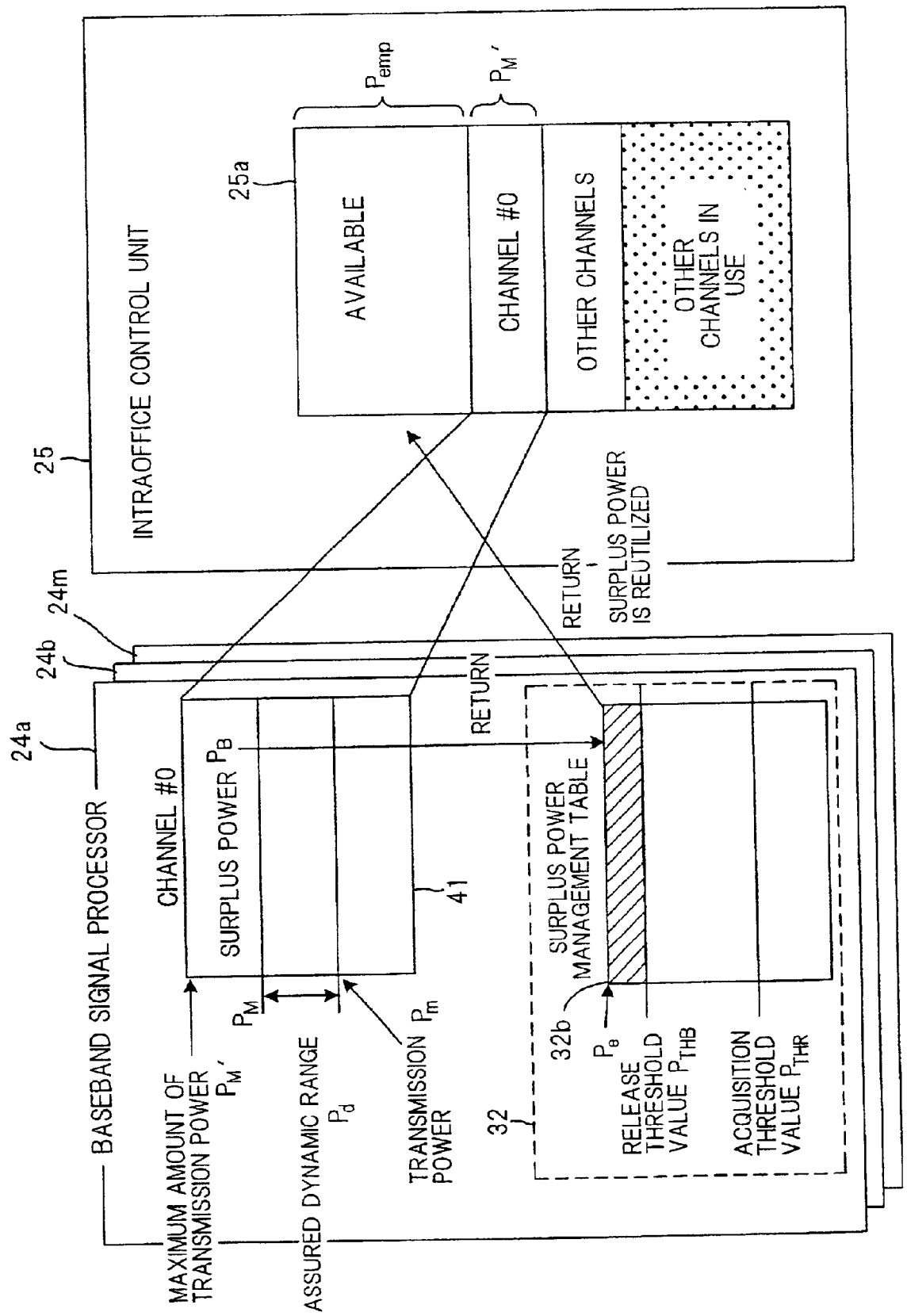
FIG. 10 is a diagram useful in describing return of surplus power.

FIG. 10 illustrates a case where surplus power $P_B$ from the power controller 41 of the individual-channel baseband section is returned to the power management unit 32 of the baseband signal processor 24a, the surplus power $P_e$ managed by the surplus power management table 32b of power management unit 32 exceeds the release threshold value $P_{THB}$ and amount of power above the threshold value is returned to the intraoffice control unit 25.

Figure 11:
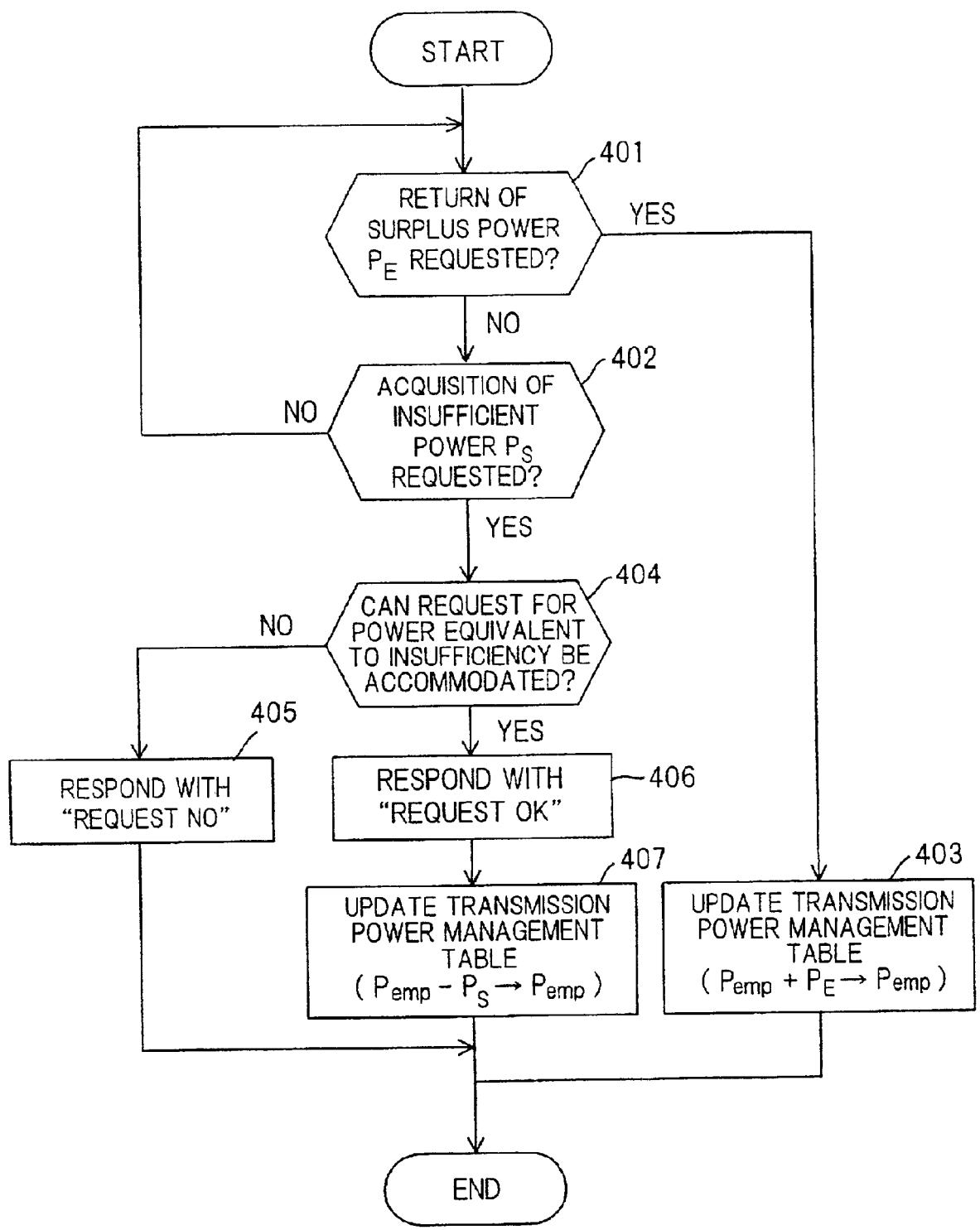
FIG. 11 is a flowchart of processing executed by an intraoffice control unit for returning surplus power and requesting power to compensate for power insufficiency.

(d) Processing Executed by Intraoffice Control Unit for Returning Surplus Power and Requesting Power to Compensate for Power Insufficiency FIG. 11 is a flowchart of processing executed by the intraoffice control unit for returning surplus power and requesting power to compensate for power insufficiency.

The intraoffice control unit 25 performs monitoring to determine whether a request for return of surplus power $P_E$ (step 401) or a request for power equivalent to insufficient power $P_S$ (step 402) has been issued from the power management unit 32 of the baseband signal processor.

If return of surplus power $P_E$ is requested, then remaining power $P_{emp}$ being managed by the transmission power management table 25a is updated (step 403) in accordance with the following equation:

$$P_{emp} + P_E \; P_{emp}$$

If power in an amount equivalent to the insufficient power $P_S$ is requested, on the other hand, then the intraoffice control unit 25 compares the insufficient power $P_S$ and remaining power $P_{emp}$ in terms of size (step 404). If $P_{emp} < P_S$ holds and, hence, the requested power to make up for the insufficiency cannot be accommodated ("NO" at step 404), then the fact that the request cannot be granted ("request NO") is reported to the power management unit 32 (step 405). If $P_{emp} > P_S$ holds and, hence, the requested power to make up for the insufficiency can be accommodated ("YES" at step 404), then the fact that the request can be granted ("request OK") is reported to the power management unit 32 (step 406) and the intraoffice control unit 25 updates the remaining power $P_{emp}$, which is being managed by the transmission power management table 25a, in accordance with the following equation (step 407):

$$P_{emp} - P_S = P_{emp}$$

(e) Processing at Channel Disconnect

Figure 12:
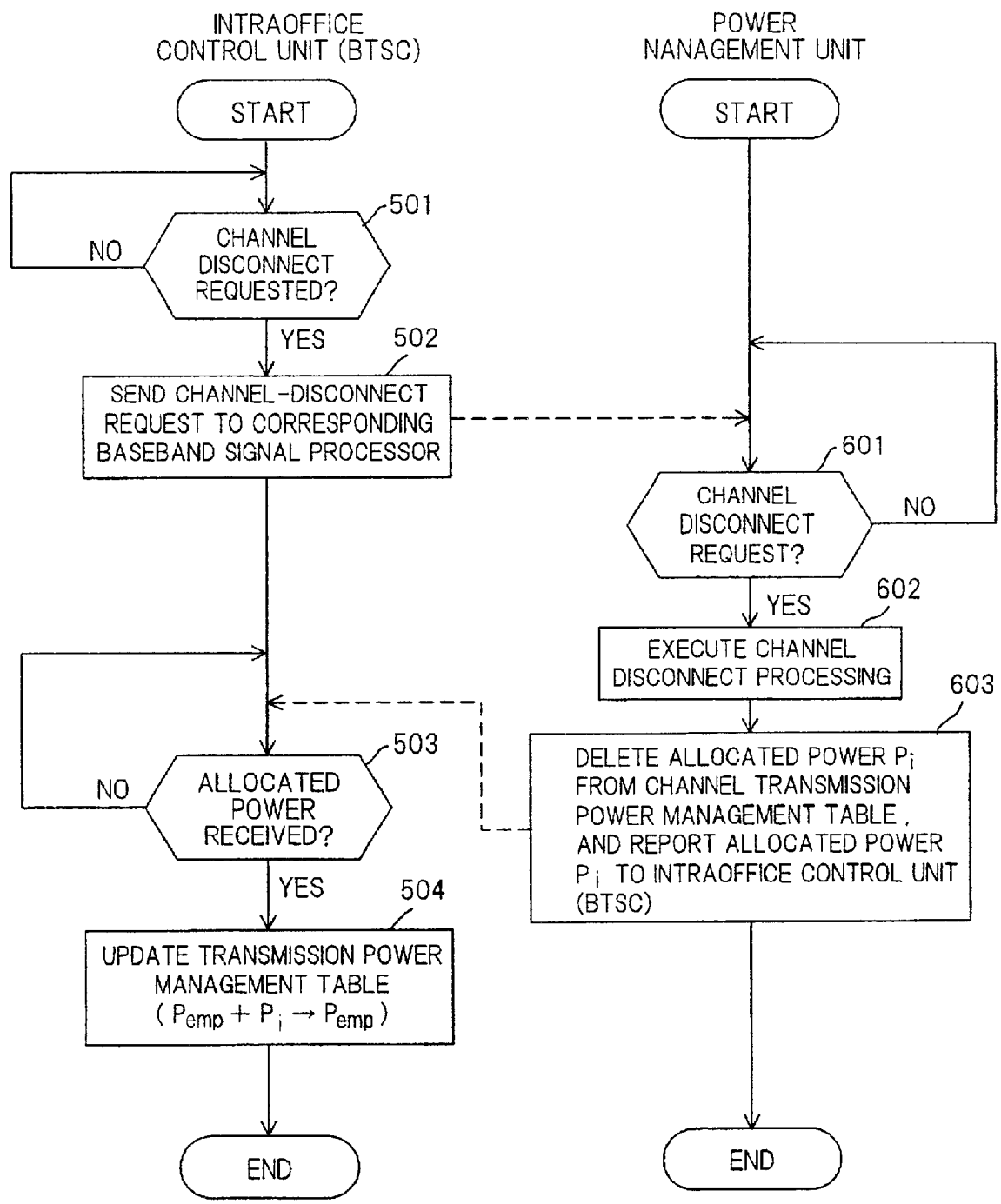
FIG. 12 is a flowchart of processing when a channel is disconnected.
Figure 15:
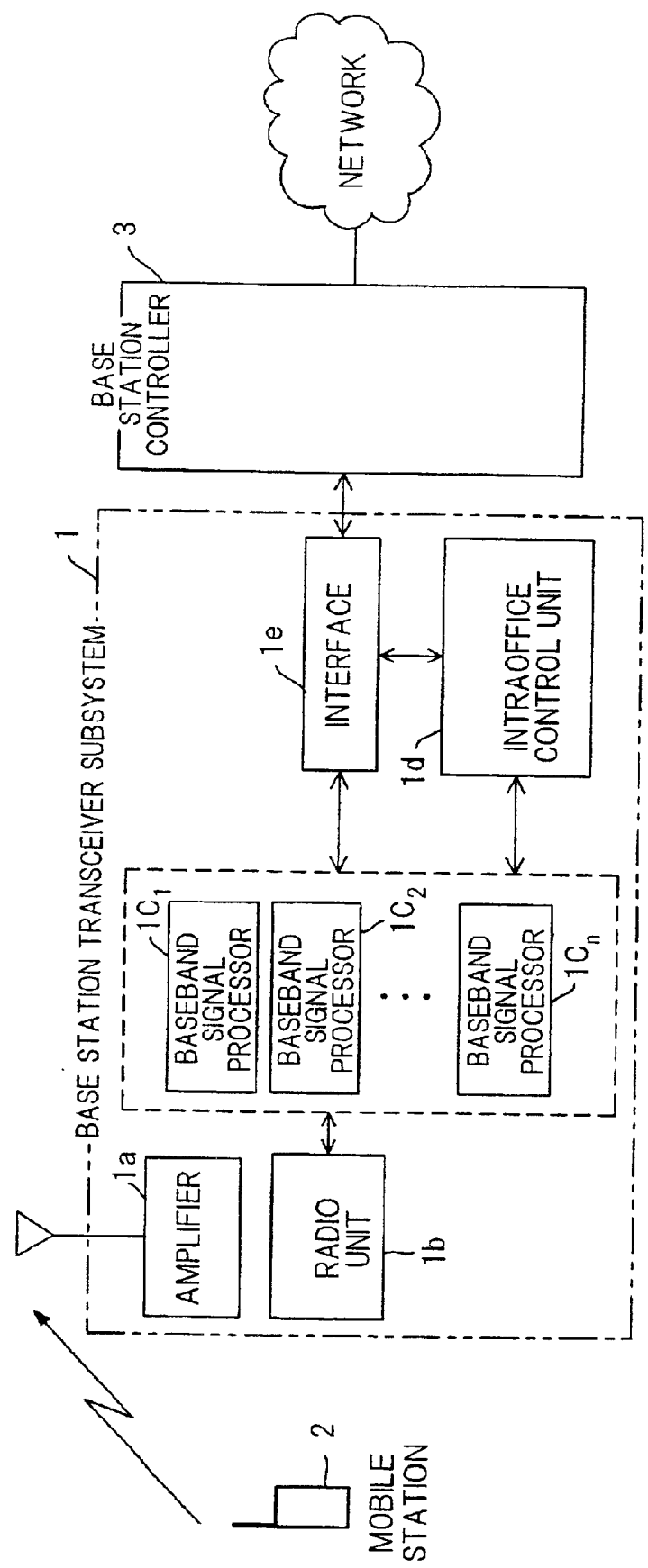
FIG. 15 is a block diagram illustrating the entirety of a mobile radio system that includes a base station transceiver subsystem according to the prior art.
Figure 16:
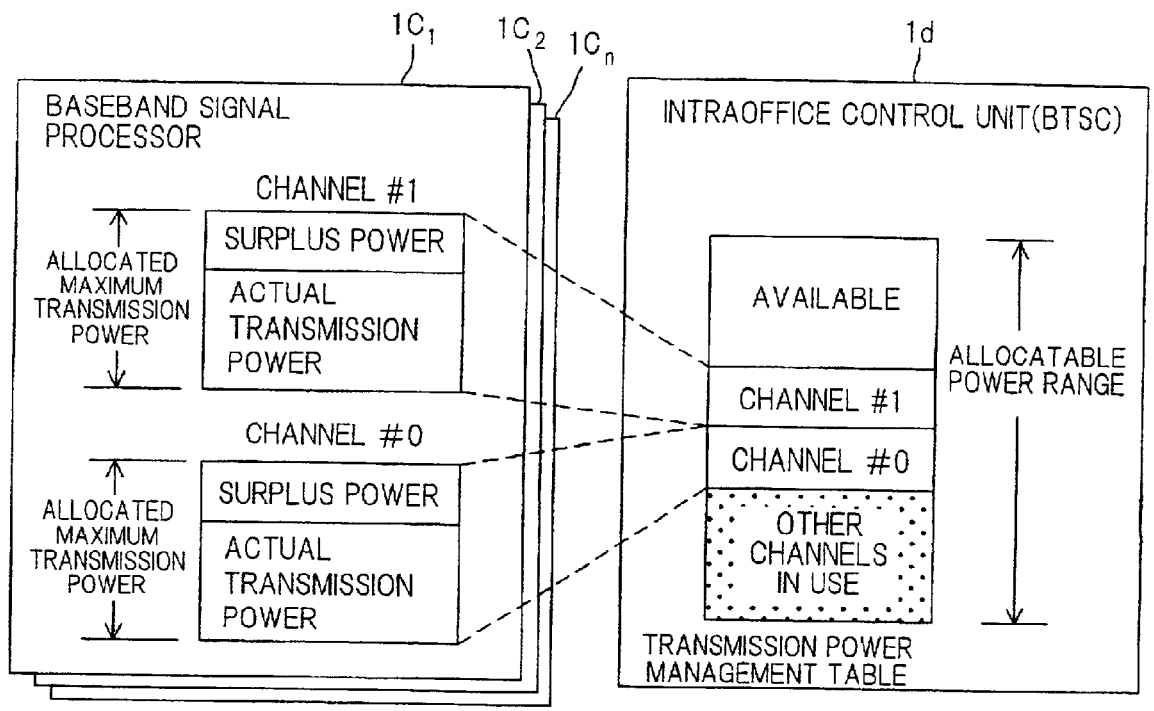
FIG. 16 is a diagram useful in describing power allocation according to the prior art.

FIG. 12 is a flowchart of processing when a channel is disconnected.

When a request to disconnect a speech channel is issued (step 501), the intraoffice control unit 25 sends a channel disconnect request to the baseband signal processor to which this speech channel has been assigned (step 502) and waits for this baseband signal processor to notify it of allocated power (step 503).

The power management unit 32 of the baseband signal processor performs monitoring to determine whether a channel disconnect request has been issued by the intraoffice control unit 25 (step 601). If a channel disconnect request is received, the power management unit 32 executes channel disconnect processing (step 602), deletes the corresponding disconnected channel and the allocated power $P_i$ from the channel transmission power table 32a and reports the allocated power $P_i$ to the intraoffice control unit 25 (step 603).

Upon being notified of the allocated power $P_i$, the intraoffice control unit 25 updates the remaining power $P_{emp}$, which is being managed by the transmission power management table 25a, in accordance with the following equation (step 504):

$$P_{emp} + P_E \rightarrow P_{emp}$$

(C) Method of Deciding Release Threshold Value and Acquisition Threshold Value

The power management unit 32 of the baseband signal processor monitors the surplus power $P_e$ periodically. When the release threshold value $P_{THB}$ is exceeded, the power management unit 32 returns the amount $P_B$ (=$P_e - P_{THB}$) of excess to the intraoffice control unit 25. Conversely, when the surplus power $P_e$ falls below the acquisition threshold value $P_{THR}$, the power management unit 32 requests the intraoffice control unit 25 for provision of additional power equivalent to the amount $P_R$ (=$P_{THR} - P_e$) of the shortfall.

The release threshold value $P_{THB}$ and acquisition threshold value $P_{THR}$ are not fixed values and need to be decided for every baseband signal processor in dependence upon the total allocated power of the channel that has been assigned to each baseband signal processor. Accordingly, the intraoffice control unit 25 decides the release threshold value $P_{THB}$ and acquisition threshold value $P_{THR}$ in the manner described below and sets these in the power management unit 32 of each baseband signal processor.

Consider a case where m channels CH_1, CH_2, ..., CH_m have been set up in a prescribed baseband signal processor. Let G_k ($1 \leq k \leq m$) represent the maximum amount of transmission power that has been allocated to each channel CH_k at channel set up, and let S represent the total amount of power that has been set in the baseband signal processor. The following equation will then hold:

$$S = G\_1 + G\_2 + \ldots + G\_m$$

Let a ratio (power return ratio) for deciding the release threshold value $P_{THB}$ for return of power be represented by P_REL ($0 \leq P\_REL \leq 1$), and let a ratio (power acquisition ratio) for deciding the acquisition threshold value $P_{THR}$ for requesting provision of additional power equivalent to the power insufficiency be represented by P_ADD ($0 \leq P\_ADD < P\_REL \leq 1$). The intraoffice control unit 25 decides the release threshold value $P_{THB}$ and acquisition threshold value $P_{THR}$ in accordance with the following equations for every baseband signal processor:

$$P_{THB} = S \times P\_P\_PEL$$

$$P_{THR} = S \times P\_ADD$$

and sets these values in the baseband signal processor. When the surplus power $P_e$ exceeds the release threshold value $P_{THB}$, the power management unit 32 of the baseband signal processor returns the amount of excess to the intraoffice control unit 25. Conversely, when the surplus power $P_e$ falls below the acquisition threshold value $P_{THR}$, the power management unit 32 requests the intraoffice control unit 25 for power in an amount equivalent to the shortfall.

(D) Method of Deciding Maximum Value of Transmission Power

It is necessary to decide the release threshold value $P_{THB}$ and acquisition threshold value $P_{THR}$, which are used by a baseband signal processor to request the intraoffice control unit for return of surplus power or for provision of additional power equivalent to a power insufficiency, taking into consideration the fact that there are calls for which the power tends to rise and fall, as is the case with voice calls for which the size of transmit data varies constantly.

In accordance with section (C) above, the release threshold value and acquisition threshold value depend upon the maximum value of transmission power of each channel assigned to a baseband signal processor. Accordingly, the maximum value of transmission power of a communication channel is set variably depending upon the transmission rate. If this expedient is adopted, the release threshold value $P_{THB}$ and acquisition threshold value $P_{THR}$ can be varied in conformity with the call (transmission rate).

Depending upon the call, there are instances where the transmission rate is variable. In such cases also it is necessary to set the release threshold value $P_{THB}$ and acquisition threshold value $P_{THR}$ upon deciding the maximum transmission power. To accomplish this, the present invention uses the following method to calculate the maximum transmission power of a speech channel whose transmission rate is variable: By way of example, assume that there is a speech channel for which the transmission rate varies, and let H_k represent the transmission power of each variable rate (R_k ($0 \leq k \leq n$) and P_k the probability of occurrence, as shown in FIG. 13. Under these assumptions, the average transmission power of this speech channel is calculated in accordance with the following formula:

$$H\_1 \cdot P\_1 + H\_2 \cdot P\_2 + \ldots + H\_n \cdot P\_n$$

where $\Sigma P\_k=1$ holds. The upper-limit value of the average transmission power is taken as the maximum transmission power G_1 and the threshold-value setting is made using the equations cited in section (C).

(E) Method of Deciding Release Threshold Value and Acquisition Threshold Value Conforming to Number of Multiplexed Channels Threshold values for requesting return of surplus power or for provision of power equivalent to power insufficiency are decided taking into consideration the number of channels multiplexed during communication and the peaky nature of voice and high-speed data communications. The reason for this is that the amount of power required rises because the higher the number of communication channels multiplexed, the greater the amount of interference with respect to a single channel. In other words, the greater the number of channels multiplexed, the larger the acquisition threshold value $P_{THR}$ and release threshold value $P_{THB}$ must be made.

Accordingly, if the total number of channels capable of being set up for one baseband signal processor is 30, the number of connected channels is partitioned at five-channel intervals, as shown in FIG. 14, and the larger the number of multiplexed channels becomes, the larger the ratios of the release threshold value and acquisition threshold value (the power return ratio and power acquisition ratio) for each baseband signal processor are made. If this expedient is adopted, then, in a case where 12 channels CH1 to CH12 are communicating, the power return ratio and power acquisition ratio will be P_REL_11_15, P_ADD_11_15, respectively, and the release threshold value $P_{THB}$ and acquisition threshold value $P_{THR}$ will be as follows:

$$P_{THB}=S \times P\_REL\_11\_15$$

$$P_{THR}=S \times P\_ADD\_11\_15$$

(F) Conversion of Data Call to Voice Call

Transmission rate for a data call differs from that for a voice call. In a case where the release threshold value $P_{THB}$ and acquisition threshold value $P_{THR}$ are changed in dependence upon the number of multiplexed channels in section (E) above, therefore, it is necessary to execute processing upon converting one channel of a data call to a number of channels of a voice call. Accordingly, voice activity VA and data activity DA are defined. Voice activity VA is a band ratio in which a set physical band is occupied evenly by a voice call, whereas data activity DA is a band ratio in which a set physical band is occupied evenly by a data call. Hence if VA=0.45, DA=1 holds and a 153.6-kbps data call is converted to a 9.6-kbps voice call, then we have (153.6× DA)/(9.6×VA)≈36 (channel/9.6-kbps voice call) In calculation of the multiplex number of communicating channels in section (E), therefore, the release threshold value and acquisition threshold value are decided by calculating a 153.6-kbps data call as being 36 channels and obtaining the power release ratio and power acquisition ratio.

In the embodiment set forth above, a case in which power management is carried out at a radio base station is described. However, it can be so arranged that similar power management is performed by base station controller. It is also possible to adopt an arrangement in which similar power management is performed by work sharing and cooperation between a radio base station and a base station controller.

In accordance with the present invention, the limited power of a radio base station can be utilized efficiently and the number of users accommodated can be increased.

Further, in accordance with the present invention, it is so arranged that transmission power that is in surplus at each communication channel is returned to a power allocation controller. As a result, surplus power can be exploited by re-allocating it to the channel of a new call.

Further, in accordance with the present invention, power greater than the maximum transmission power can be allocated to a channel. This makes it possible to improve communication quality if communication conditions deteriorate.

Further, in accordance with the present invention, management that takes fluctuating transmission power into consideration can applied to a communication channel the transmission power whereof tends to rise and fall. This makes it possible to achieve appropriate power allocation.

Further, in accordance with the present invention, management of surplus power that takes mutual interference between communication channels into consideration can be performed depending upon number of channels multiplexed during communication. This also makes it possible to achieve appropriate power allocation.

Further, in accordance with the present invention, management of surplus power that takes mutual interference between communication channels into account can be performed by factoring in number of multiplexed communicating channels, which takes voice calls, data calls and high and low speeds into consideration. This also makes it possible to achieve appropriate power allocation.

As many apparently widely different embodiments of the present invention can be made without departing from the spirit and scope thereof, it is to be understood that the invention is not limited to the specific embodiments thereof except as defined in the appended claims.

What is claimed is:

1. A network device of a mobile communications system, comprising:

a power allocation controller for allocating a prescribed transmission power to a communication channel requested for set-up within an allocatable power range, and forgoing allocation of transmission power when allocation s nor possible;

a channel power controller, which is provided on a per-channel basis for performing transmission power control on a per-channel basis, wherein when actual transmission power falls below the allocated transmission power, said channel power controller returns power equivalent to the power difference between these and subsequently repeats similar control while regarding the actual transmission power as the allocated transmission power, and when the actual transmission power exceeds the allocated transmission power, said channel power controller requests power equivalent to the power difference between these; and a multiple-channel power management unit for managing as surplus power the power returned from each channel power controller, and allocating, from the surplus power, the power requested from each channel power controller, wherein when the surplus power exceeds a release threshold value, said multiple-channel power management unit returns the amount of surplus power above the threshold value to said power allocation controller, and when the surplus power falls below an acquisition threshold value, said multiple-channel power management unit requests said power allocation controller for power equivalent to the amount of shortfall below the threshold value.

2. The device according to claim 1, wherein said multiple-channel power management unit manages the allocated transmission power of each channel and, in response to a communication-channel disconnect request, returns to said power allocation controller the transmission power that was allocated to this communication channel.

3. The device according to claim 1, wherein said multiple-channel power management unit decides the release threshold value and the acquisition threshold value by multiplying the sum total of transmission power allocated to each channel by a power return ratio and a power acquisition ratio, respectively.

4. The device according to claim 3, wherein said power allocation controller decides transmission power, which is allocated to each communication channel, in conformity with transmission rate.

5. The device according to claim 3, wherein said power allocation controller decides transmission power allocated to a communication channel, the transmission rate whereof is variable, upon taking probability of occurrence of each transmission rate into consideration.

6. The device according to claim 3, wherein said multiple-channel power management unit decides the power return ratio and the power acquisition ratio based upon number of channel, multiplexed during communication.

7. The device according to claim 6, wherein a data call is converted to a voice call to obtain number of channels multiplexed during communication, and the power return ratio and power acquisition ratio are decided based upon the number of channels multiplexed.

8. A method of managing power in a network device of a mobile communications system, comprising:

allocating a prescribed transmission power to a communication channel requested for set-up within an allocatable power range;

performing transmission power control on a per-channel basis, and when actual transmission power falls below the allocated transmission power, returning power equivalent to the power difference between these and subsequently repeating similar control while regarding the actual transmission power as the allocated transmission power, and when the actual transmission power exceeds the allocated transmission power, requesting power equivalent to the power difference between these; and managing as surplus power the power returned from each channel, allocating, from the surplus power, the additional power requested from each channel, and when the surplus power exceeds a release threshold value, returning the amount of surplus power above the threshold value to power allocation means, and when the surplus power falls below an acquisition threshold value, requesting said power allocation means for power equivalent to the amount of shortfall below the threshold value.

9. The method according to claim 8, further comprising steps of managing the allocated transmission power of each channel and, in response to a communication-channel disconnect request, returning to said power allocation means the transmission power that was allocated to this communication channel.

* * * * *